United States Patent Office 3,200,127
Patented Aug. 10, 1965

3,200,127
2-AMINO-1 SULFONIC ACIDS
Donald L. Klass, Barrington, Ill., assignor to The Pure Oil Company, Chicago, Ill., a corporation of Ohio
No Drawing. Filed Oct. 24, 1960, Ser. No. 64,316
8 Claims. (Cl. 260—294.8)

This invention relates to an improved process for making beta-aminated sulfonic acids from olefinic starting materials. In another aspect, this invention relates to certain new surfactants characterized as beta-aminated sulfonic acid salts and derivatives therefrom.

The reaction between an olefinic bond and a sulfonating agent has long been known, and the formation of the cyclic sulfonate-sulfate anhydride or carbyl sulfate has been suggested as an intermediate in olefin sulfonations. Bordwell and Peterson (JACS, vol. 76, pp. 3952–3956) report the reaction of hexene-1 with twice the molar quantity of dioxane-sulfur trioxide reagents to proceed as follows:

(1)
$$n-C_4H_9CH=CH_2 + SO_3\text{-dioxane} \longrightarrow \begin{matrix} n-C_4H_9CH-CH_2 \\ O \diagdown \diagup SO_2 \\ SO_2-O \end{matrix}$$

Upon hydrolysis in cold water, this yields 2-hydrosulfato-1-hexane sulfonic acid and this product yields, on further hydrolysis with hot water, 2-hydroxy-1-hexanesulfonic acid. To establish the mechanism of this hydrolysis reaction, these investigators investigated the reaction of hexane carbyl sulfate with aniline, followed by hydrolysis of the product, and found the following reactions to take place:

(2)
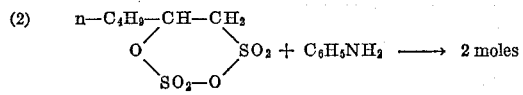

(3)
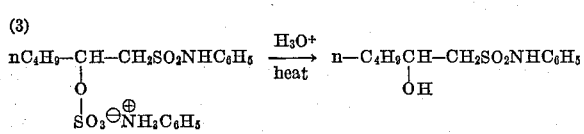

Furthermore, Bordwell and Peterson report that the reaction of hexene-1 with 1 mole of $SO_3$-dioxane reagent forms:

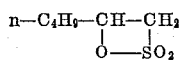

and reaction of this product with 2 moles of aniline yields:

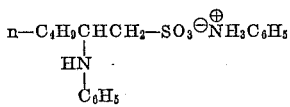

In accordance with the process aspect of this invention, I have found that the sulfonation of a terminal or nonterminal olefin of the proper molecular weight with an equimolar amount of sulfur trioxide in the form of a complex, and subsequent reaction with an equimolar amount of an amine, results in the formation of beta-aminated sulfonic acids, and that certain of these have excellent surfactant properties. Using an alpha-oelfin as an illustration, the relationship of these reactions may be illustrated as follows:

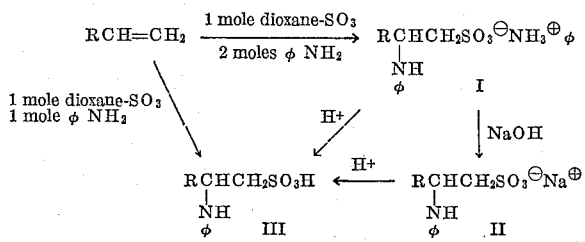

Further reaction of the beta substituted sulfonic acid (I) with aqueous base yields the corresponding sodium salt (II). It is unexpected that the free acid (III), probably in the form of "Zwitterion" internal salt, is obtained by treating an alpha-olefinic hydrocarbon with an equimolar amount of the sulfur trioxide complex, followed by treatment of the reaction solution with an equimolar amount of amine, instead of two moles of amine as reported by Bordwell and Peterson. Thus, it appears that a compound capable of donating a pair of electrons, in this case aniline, attacks the beta carbon atom first rather than the sulfonic acid oxygen atom. This means that compounds having the structural grouping:

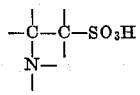

where N is trivalent or tetravalent, can be prepared using the above scheme. Furthermore, I have also unexpectedly found that treatment of products of structures I and II with hydrochloric acid solution does not yield the hydrochloride of III as expected, but rather yields free compound III. Treatment of compound I and compound II with sulfuric acid also yields compound III. Thus, the beta anilinium sulfonic acid appears not to be basic enough to form salts with mineral acids. A similar phenomenon is encountered with sulfanilic acid. This compound gives only starting material from concentrated hydrochloric acid and not the hydrochloride as one would expect. This behavior was observed when 1-dodecene and 1-hexene were used as starting materials. However, it should be pointed out that beta-amino groups derived from aliphatic and aralkyl amines would probably form acid salts.

During the course of the work with 1-dodecene and 1-hexene, I also discovered that the corresponding structures I, II and III (with R as $CH_3(CH_2)_9$—) are excellent surfactants, whereas the product I, where R was $CH_3(CH_2)_3$—, had poor surface-activity properties. Likewise, products II and III prepared from I, with R as $CH_3(CH_2)_3$—, exhibited poor surface-active properties.

It becomes therefore the primary object of this invention to provide a process for the preparation of beta-aminated sulfonic acids and derivatives, a new class of surfactants having the formula:

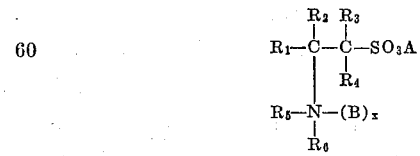

wherein $R_1$, $R_2$, $R_3$, $R_4$, $R_5$ and $R_6$ are the same or different substituents selected from the group consisting of hydrogen and alkyl, aryl, alkaryl, aralkyl, cycloalkyl and heterocyclic radicals containing up to 20 carbon atoms, A represents a cation such as hydrogen, a metal such as an alkali metal or alkaline earth metal, and tetravalent nitrogen, and B is an acid group, such as mineral acid (i.e., hydrohalic, sulfuric, nitro, phosphoric), with $x$ being 0 or 1, wherein when either $R_5$ or $R_6$ are aryl, $x$ is 0; when $R_5$ or $R_6$ are alkyl, cycloalkyl or hydrogen, $x$ is 0 or 1 by the foregoing reaction. In the case where $x$ is 0, the nitrogen atom is not in the tetravalent state unless a tertiary amine is used or unless A is hydrogen, in which case the product exists as the electrically neutral form, or the "Zwitterion" internal salt.

Regarding the novel surfactant products prepared from alpha olefins, the $R_1$ group and products I, II and III must contain more than 4 carbon atoms if aniline is used as the amine or surface-active properties will be lacking. If R is equal to or is smaller than 4, the amine must be increased in molecular weight to give compounds exhibiting surface-active properties.

Another object of this invention is to provide novel surfactant compounds of the formula:

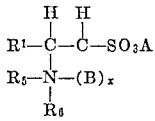

wherein $R^1$ is an alkyl, cycloalkyl, aryl, aralkyl, alkaryl or heterocyclic radical containing at least 6 carbon atoms and up to 20 carbon atoms, A is a cation selected from the group of hydrogen, a metal, and tetravalent nitrogen, B is an acid group, $x$ is zero or one, and $R_5$ and $R_6$ are as previously defined.

Another object of this invention is to provide novel surfactant compounds of the formula:

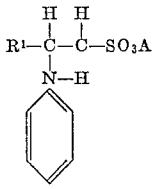

wherein $R^1$ and A are previously defined.

These and other objects of the invention will be described or become apparent as the specification proceeds.

In order to demonstrate the invention, a series of experiments was conducted.

EXAMPLE 1

A 168-g. (1 mole) portion of 1-dodecene was added to a complex prepared from 80 g. (1 mole) of sulfur trioxide and 88 g. (1 mole) of dioxane, in 200 ml. of ethylene dichloride. The addition was carried out at 0° C., with stirring, over a period of 1 hour. The resulting light-yellow solution was maintained at —15° C. for two days, after which it was warmed to 0° C., and 186 g. (2 moles) of aniline in 200 ml. of ethylene dichloride were added. The resulting solution was maintained at —15° C. for two days, during which time Compound I ($R_1$ was $CH_3(CH_2)_9$—) precipitated. The precipitate was filtered from the liquid by the use of vacuum, and was dried with air to attain a yield of 181 g. A small sample of the product was recrystallized from water, resulting in the formation of small, white crystals having a melting-point range of 100–108° C.

EXAMPLE 2

A 3-g. portion of Compound I, in 25 ml. of water containing 1.5 g. of sodium hydroxide, was warmed on a steam bath for 1 hour, after which the reaction mass was allowed to cool to room temperature, whereupon Compound II ($R_1$ was $CH_3(CH_2)_9$—) precipitated as a fluffy, white crystalline product. The precipitate was recovered by filtration, and was air-dried, yielding 1.5 g. of a product having a melting-point range of 67–70° C.

EXAMPLE 3

A 0.75-g. portion of product II was dissolved in 10 ml. of 10% hydrochloric acid, and the solution was heated on a steam bath for 1 hour. Then the solution was cooled to room temperature, and Compound III ($R_1$ was $CH_3(CH_2)_9$—) was recovered by filtration and dried, yielding 0.5 g. of a product having a melting-point range of 199–201° C.

EXAMPLE 4

The suds-forming and surface-tension-depressing abilities of the products of Examples 1, 2 and 3 were determined in soft and hard water. The results given in Tables I and II show all of these products to be substantially equal to or superior to a commercial detergent designated as "Compound A."

Table I.—Suds-forming abilities of Compounds I, II, III in soft water [1]

| Compound | Appearance of solution | Suds formed at room temperature [2] | Surface tension, drynes/cm. | Time to suds disappearance, hrs. |
|---|---|---|---|---|
| I | Turbid | 1 | 32.5 | 24 |
| II | Clear | 1 | 34.5 | 8 |
| III | Turbid | 3 | 36.3 | 7 |
| Water | Clear | 10 | 72.0 | 0 |
| Compound "A" [3] | Turbid | 2 | 36.0 | 20 |

[1] 0.1% aqueous solutions of compounds I, II and III and a commercial detergent, Compound A, were prepared using distilled water.
[2] Rating system. 1 to 10, 1=large volume of suds, 10=no suds formed. Suds formed by hand-shaking a 4 oz. bottle 25 times with an equal amount of each 0.1% solution.
[3] Compound A is not chemically similar to the surfactants of this invention, but was used as a commercially available example for purposes of comparison.

Table II.—Suds-forming abilities of Compounds I, II, III in hard water [1]

| Compound | Appearance of solution | Suds formed at room temperature [2] | Time to suds disappearance, hrs. |
|---|---|---|---|
| I | No Ppt | 2 | 2 |
| II | Ppt | 3 | 1 |
| III | Ppt | 2 | 2 |
| Water | No Ppt | 10 | 0 |
| Compound A | Ppt | 6 | 0.58 |

[1] Compounds I, II and III, and Compound A each at 0.05% concentration in distilled water containing sufficient calcium chloride to make 360 parts/million as calcium carbonate.
[2] Rating system. Same as in Table I.

EXAMPLE 5

A 168-g. (1 mole) portion of 1-dodecene was added to a complex prepared from 80 g. (1 mole) of sulfur trioxide and 88 g. (1 mole) of dioxane, in 200 ml. of ethylene dichloride. The addition was carried out at 0° C., with stirring, over a period of 1 hour. The resulting, light-yellow solution was kept at —15° C. for two days, after which it was warmed to 0° C. and treated with 93 g. (1 mole) of aniline in 200 ml. of ethylene dichloride. The resulting solution was kept at —15° C. for two days, during which time Compound III precipitated. It was identified by direct comparison with III above. The solid was recovered by vacuum filtration, and dried in air, resulting in a yield of 97 g. of crude III. The comparison sample after recrystallization had a melting point of 200–202° C.

EXAMPLE 6

The 97 g. of crude product III from Example 5 were dissolved in 500 ml. of water which contained in 30 g. of sodium hydroxide, and the resulting solution was successively warmed on a steam bath for 1.5 hours, cooled in an ice bath, and neutralized with 10% hydrochloric acid. During the neutralization step, an oil precipitated, and when the mixture was cooled still further, the oil phase solidified. This solid phase was recovered by filtration, washed with water, and recrystallized. The resulting product, designated as Compound IV, separated from the alcohol in relatively pure form as fluffy, white crystals which had a melting point range of 209–230° C. (decomposition). Six grams of the product IV were recovered and identified as:

(IV)
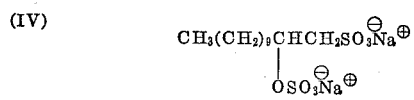

by analyses and infrared spectra.

EXAMPLE 7

A 0.75-g. portion of product I above was dissolved in 10 ml. of 10% hydrochloric acid solution, and the solution was warmed on a steam bath for 1 hour. The resulting product, designated as product III, was recovered by filtration, and had a weight of 0.55 g. and a melting point of 198–200° C. It was identical to the product obtained from 1-dodecene by treatment with an equimolar amount of sulfur trioxide-dioxane complex and subsequent treatment with twice the equimolar amount of aniline, followed by treatment with sodium hydroxide and treatment of the resulting product with hydrochloric acid.

EXAMPLE 8.—(ANILINE SALT OF 2-ANILINO-HEXANE-1-SULFONIC ACID)

The known prior art procedure of Bordwell and Peterson was used. 1-hexene (21.5 g.) was added to the complex prepared from 20.5 g. sulfur trioxide and 22.6 g. of dioxane at 0° C. in 75 ml. of ethylene dichloride. The mixture was stirred for 30 minutes and then 50.0 g. of aniline was added dropwise. A white precipitate formed at the end of the addition. The mixture was kept at room temperature for 3 days, filtered, and the precipitate was washed with ethylene dichloride and air-dried, wt. 40.1 g., M.P. 80–92° C. Ten g. recrystallized from about 200 ml. of water and 10 ml. of alcohol gave 8.0 g. of the pure aniline salt of 2-anilino-hexane-1-sulfonic acid, as white needles, M.P. 108–112° C. (in vacuo). Bordwell and Peterson reported M.P. 105–110° C. This product is I, with $CH_3(CH_2)_3$— as $R_1$.

EXAMPLE 9.—(2-ANILINO-HEXANE-1-SULFONIC ACID)

Crude aniline salt from Example 8, 2.5 g. (0.00715 mole), was treated with 69.2 ml. of 0.1033 N hydrochloric acid (0.00715 mole). Evaporation on the water bath under nitrogen to about 15 ml. gave the free sulfonic acid. The product was filtered, washed with a small amount of ether, and dried, M.P. 215–219° C. This product is III, with $CH_3(CH_2)_3$— as $R_1$.

EXAMPLE 10.—(SODIUM 2-ANILINO-HEXANE-SULFONATE)

Attempts were made to prepare a crystalline sodium salt by treatment of the aniline salt with sodium hydroxide. All experiments resulted in the formation of oily products. For the purposes of measuring surface-active properties, the free acid was dissolved in distilled water and treated with an equimolar amount of aqueous sodium hydroxide solution to give 0.1% aqueous solutions of sodium salt. Each of these compounds from Examples 8, 9 and 10 were examined for surface-active properties as 0.1% aqueous solutions. Unlike the compounds prepared from dodecene-1, these products exhibited little or no surface-active properties. All of the surface tensions were greater than 50 dynes/cm. and suds ratings were 8 to 10.

In order to identify and establish the formulas of the various compounds that were prepared, selected ones were analyzed, tested for unsaturation, and their melting points were determined after purification. The results are shown in the following table:

*Table III*

| Compound | I | II | III | IV |
|---|---|---|---|---|
| M.P., °C | 103–106 | 67–70 | 200–202 | 209–223 (dec.) |
| Analysis (alc'd): | | | | |
| C | 66.4 | 54.1 | 60.1 | 35.1 |
| H | 8.77 | 8.58 | 9.75 | 6.42 |
| S | 7.38 | 8.03 | | 15.7 |
| N | 6.45 | 3.51 | | |
| Na | | 5.76 | | 11.3 |
| Analysis (found): | | | | |
| C | 66.8 | 54.5 | 60.8 | 35.4 |
| H | 9.2 | 8.5 | 9.3 | 6.6 |
| S | 7.0 | 8.0 | | 15.9 |
| N | 6.4 | 3.6 | | |
| Na | | 7.8 | | 11.5 |
| Empirical formula | (1) | (2) | (3) | (4) |
| Bromine test | positive | positive | positive | positive |

1 $C_{24}H_{38}O_3N_2S$.
2 $C_{18}H_{30}O_3NSNa \cdot 2H_2O$.
3 $C_{18}H_{33}O_4NS$.
4 $C_{12}H_{24}O_7S_2Na_2 \cdot H_2O$.

Since the mere fact that a compound forms a foam with water and/or lowers the surface tension of water does not always indicate that the compound will function as a detergent, a series of experiments were conducted with carbon black suspensions in dilute aqueous solutions with some of the foregoing products. The results are summarized in the following table.

*Table IV.—Rate of Carbon Black Settling*

| Time | Water Control | I. $CH_3(CH_2)_9CHCH_2SO_3^{\ominus}NH_3^{\oplus}\phi$ \| NH \| $\phi$ | IV. $CH_3(CH_2)_9CHCH_2SO_3^{\ominus}Na^{\oplus}$ \| O \| $SO_3^{\ominus}Na^{\oplus}$ |
|---|---|---|---|
| 0 | Opaque | Opaque | Opaque. |
| 15 min | Almost clear | do | Do. |
| 30 min | Clear | do | Do. |
| 1 hour | do | do | Do. |
| 2 hrs | do | Slight clearing | Do. |
| 3 hrs | do | do | Do. |

In conducting these experiments, 100 ml. of 0.1% aqueous solutions of the compounds and 100 ml. of water were treated with 1.0 g. of "Norit A" carbon black and handshaken 25 times in a stoppered, 100-ml. graduate. Observations were then made periodically of the supernatant solution and particles suspended above the bulk of the carbon black which settled to the bottom within 15 minutes. The term "clear" in the table means that about 99% of the carbon black has settled to the bottom of the graduate and the term "opaque" means that a stable suspension of cleansing action was obtained.

Table V sets forth a number of species of compounds by formula and name coming within the definition of the process invention.

Table V

| Formula | Name |
|---|---|
| CH₃(CH₂)₃CH(NH₂)CH₂SO₃H | 2-Amino-hexane-1-sulfonic acid. |
| CH₃(CH₂)₃CH(NH₂)CH₂SO₃Na | Sodium 2-Amino-hexane-1-sulfonate. |
| CH₃(CH₂)₃—CH(NHCH₃)CH₂SO₃H | N-methyl-2-amino-hexane-1-sulfonic acid. |
| CH₃(CH₂)₃CH(NHCH₃)CH₂SO₃K | Potassium-N-methyl-2-amino-hexane-1-sulfonate. |
| CH₃(CH₂)₃CH(NHC₂H₅)CH₂SO₃H | N-Ethyl-2-amino-hexane-1-sulfonic acid. |
| CH₃(CH₂)₃CH(NHC₂H₅)CH₂SO₃Na | Sodium-N-ethyl-2-amino-hexane-1-sulfonate. |
| CH₃(CH₂)₃CH(NHC₃H₇)CH₂SO₃H | N-Propyl-2-amino-hexane-1-sulfonic acid. |
| CH₃(CH₂)₃CH(NHC₃H₇)CH₂SO₃NH₄ | Ammonium-N-propyl-2-amino-hexane-1-sulfonate. |
| CH₃(CH₂)₃CH(NHC₄H₉)CH₂SO₃H | N-Butyl-2-amino-hexane-1-sulfonic acid. |
| CH₃(CH₂)₃CH(NHC₄H₉)CH₂SO₃Li | Lithium-N-butyl-2-amino-hexane-1-sulfonate. |
| CH₃(CH₂)₃CH(NHφ)CH₂SO₃H | 2-Anilino-hexane-1-sulfonic acid. |
| CH₃(CH₂)₃CH(NHφ)CH₂SO₃NH₄ | Ammonium-2-anilino-hexane-1-sulfonate. |
| CH₃(CH₂)₄CH(N(CH₃)₂)CH₂SO₃H | N,N-Dimethyl-heptane-1-sulfonic acid. |
| CH₃(CH₂)₄CH(N(CH₃)₂)CH₂SO₃NH₄ | Ammonium-N,N-dimethyl-heptane-1-sulfonate. |
| CH₃(CH₂)₅CH(N(CH₃)(C₂H₅))CH₂SO₃H | N-Methyl-N-ethyl-2-amino-octane-1-sulfonic acid. |
| CH₃(CH₂)₅CH(N(CH₃)(C₂H₅))CH₂SO₃NH₄ | Ammonium-N-methyl-N-ethyl-2-amino-octane-1-sulfonic acid. |
| CH₃(CH₂)₅—CH(N(C₂H₅)₂)CH₂SO₃H | N,N-Diethyl-2-amino-octane-1-sulfonic acid. |
| CH₃(CH₂)₅CH(N(C₂H₅)₂)CH₂SO₃Na | Sodium-N,N-diethyl-2-amino-octane-1-sulfonate. |
| CH₃(CH₂)₆CH(N(CH₃)(φ))CH₂SO₃H | N-Methyl-N-phenyl-2-amino-nonane-1-sulfonic acid. |
| (CH₃(CH₂)₆CH(N(CH₃)(φ))CH₂SO₃)₂Ca | Calcium-N-methyl-N-phenyl-2-amino-nonane-1-sulfonate. |
| CH₃(CH₂)₇CH(φ—CH₃)CH₂SO₃H | N-Tolyl-2-amino-decane-1-sulfonic acid. |
| (CH₃(CH₂)₇CH(NH(φ—CH₃))CH₂SO₃)₂Ba | Barium-N-tolyl-2-amino-decane-1-sulfonate. |
| CH₃(CH₂)₈CH(N(φ)(C₂H₅))CH₂SO₃H | N-Ethyl-N-phenyl-undecane-1-sulfonic acid. |
| CH₃(CH₂)₈CH(N(φ)(C₂H₅))CH₂SO₃NH₄ | Ammonium-N-ethyl-N-phenyl-undecane-1-sulfonate. |
| CH₃(CH₂)₉CH(NH cyclohexyl)CH₂SO₃H | N-Cyclohexyl-2-amino-dodecane-1-sulfonic acid. |
| (CH₃(CH₂)₉CH(NH cyclohexyl)CH₂SO₃)₃Fe₂ | Iron-N-cyclohexyl-2-amino-dodecane-1-sulfonate. |
| CH₃(CH₂)₁₀CH(N(φ)₂)CH₂SO₃H | N,N-diphenyl-2-amino-tridecane-1-sulfonic acid. |
| CH₃(CH₂)₁₀CH(N(φ)₂)CH₂SO₃NH₄ | Ammonium-N,N-diphenyl-2-amino-tridecane-1-sulfonate. |
| CH₃(CH₂)₁₁CH(NH furfuryl)CH₂SO₃H | N-furfuryl-2-amino-tetradecane-1-sulfonic acid. |
| CH₃(CH₂)₁₁CH(NH furfuryl)CH₂SO₃Na | Sodium-N-furfuryl-2-amino-tetradecane-1-sulfonate. |
| CH₃(CH₂)₁₂CH(N(CH₃)₂)CH₂SO₃Li | Lithium-N,N-dimethyl-2-amino-pentadecane-1-sulfonate. |
| CH₃(CH₂)₄CH—CH—(CH₂)₄CH₃<br>              \|   \|<br>              NHφ SO₃H | N-Phenyl-7-amino-dodecane-6-sulfonic acid. |
| CH₃(CH₂)₉CHCH₂SO₃H<br>        \|<br>     CH₃—NH—HCl | 2-Methylamino-dodecane-1-sulfonic acid hydrochloride. |
| CH₃(CH₂)₉CHCH₂SO₃⁻<br>        \|<br>        N⁺<br>      (pyridinium ring) | 2-(1-Proto-1-pyridyl)-dodecane-1-sulfonate. |
| CH₃(CH₂)₉—CHCH₂SO₃H<br>       \|<br>      N⁺ Cl⁻<br>     (pyridinium ring) | 2-Pyridinium-dodecane-1-sulfonic acid chloride. |
| CH₃(CH₂)₄—CH—CH(CH₂)₄CH₃<br>           \|     \|<br>          N⁺  SO₃⁻<br>    CH₃ CH₃ CH₃ | 7-(Proto-1-trimethyl ammonium)-dodecane-6-sulfonate. |
|           C₄H₉  C₄H₉<br>          \|     \|<br>CH₃(CH₂)₄C———C(CH₂)₄CH₃<br>          \|     \|<br>          NHφ  SO₃H | 7-Butyl-7-N-phenylamino-6-butyl-dodecane-1-sulfonic acid. |
|           φ  H<br>          \|  \|<br>CH₃(CH₂)₄C—C—(CH₂)₄CH₃<br>         \|    \|<br>    CH₃—N  SO₃H<br>      \|<br>     CH₂<br>      \|<br>     CH₃ | 7-Phenyl-7-N,N-methylethylamino-dodecane-6-sulfonic acid. |
| CH₃(CH₂)₃CH(NH₂)CH₂SO₃NH | Ammonium-2-amino-hexane-1-sulfonate. |
| CH₃(CH₂)₃CH(NHCH₃)CH₂SO₃NH₄ | Ammonium-N-methyl-2-aminohexane-1-sulfonate. |
| CH₃(CH₂)₄CH(NHCH₃)CH₂SO₃NH₃CH₃ | Methyl ammonium-2-(N-methylamino)-heptane-1-sulfonate. |
| CH₃(CH₂)₅CH(NHC₂H₅)CH₂SO₃NH₃C₂H₅ | Ethyl ammonium-2-(N-ethylamino)-octane-1-sulfonate. |
| CH₃(CH₂)₆CH(NHC₃H₇)CH₂SO₃NH₃C₃H₇ | Propyl ammonium-2-(N-propylamino)-nonane-1-sulfonate. |
| CH₃(CH₂)₇CH(NHC₃H₇)CH₂SO₃NH₃C₃H₇ | Propyl ammonium-2-(N-propylamino)-decane-1-sulfonate. |
| CH₃(CH₂)₅CH(N(CH₃)₂)CH₂SO₃NH₃φ | Aniline-2-(N,N-dimethylamino)-octane-1-sulfonate. |
| CH₃(CH₂)₆CH(N(C₂H₅)₂)CH₂SO₃NH₃φ | Aniline-2-(N,N-diethylamino)-nonane-1-sulfonate. |
| CH₃(CH₂)₇CH(NCH₃C₂H₅)CH₂SO₃Na | Sodium-N-methyl-N-ethyl-2-aminodecane-1-sulfonate. |
| CH₃(CH₂)₈CH(NHφ)CH₂SO₃K | Potassium-N-phenyl-2-aminodecane-1-sulfonate. |
| CH₃(CH₂)₃CH(OSO₃H)CH₂SO₃H | 2-sulfato-hexane-1-sulfonic acid. |
| CH₃(CH₂)₃CH(OSO₃H)CH₂SO₃Na | Sodium-2-sulfato-hexane-1-sulfonate. |
| CH₃(CH₂)₃CH(OSO₃Na)CH₂SO₃Na | Disodium-2-sulfato-hexane-1-sulfonate. |
| CH₃(CH₂)₅CH(OSO₃NH₄)CH₂SO₃NH₄ | Diammonium-2-sulfato-octane-1-sulfonate. |
| CH₃(CH₂)₅CH(OSO₃H)CH₂SO₃Na | Sodium ammonium-2-sulfato-octane-1-sulfonate. |
| CH₃(CH₂)₅CH(OSO₃H)CH₂SO₃NH₄ | Ammonium-2-sulfato-octane-1-sulfonate. |
| CH₃(CH₂)₇CH(OSO₃Na)CH₂SO₃H | Sodium-2-sulfato-decane-1-sulfonate. |
| [CH₃(CH₂)₈CH(OSO₃)CH₂SO₃]₂Ba | Barium-2-sulfate-undecane-1-sulfonate. |
| CH₃(CH₂)₁₀CH(OSO₃H)CH₂SO₃Na | Sodium-2-sulfate-tridecane-1-sulfonate. |
| CH₃(CH₂)₁₀CH(OSO₃H)CH₂SO₃H | 2-Sulfate-tridecane-1-sulfonic acid. |
| CH₃(CH₂)₁₁CH(OSO₃NH₄)CH₂SO₃NH₄ | Diammonium-2-sulfate-tetradecane-1-sulfonate. |

The olefinic starting materials for the reaction have been in part defined by the examples of the beta-aminated sulfonic acids that can be prepared in accordance with this invention. Any compound containing an olefinic double bond may be used to prepare the sulfonic acids of this invention. The only limitation attaching to the substituent groups $R_1$ to $R_4$, inclusive, is that these substituent groups are not reactable with the sulfur trioxide complex used under the conditions of the reaction necessary to cause reaction with the olefinic double bond. The various sulfur trioxide complexes that may be used in this reaction have differing reactivities and some require elevated temperatures. Under some conditions, the intermediates may decompose faster than the beta-amination reaction can proceed, in which event the yields of beta-aminated sulfonic acids may be lowered. Where the $R_1$ to $R_4$ groups are saturated alkyl radicals or cycloaliphatic radicals, no difficulty is experienced due to sulfonation occurring in the substituent group. Where the $R_1$ to $R_4$ groups are aryl, heterocyclic, or other slightly reactive groups that may sulfonate across a double bond within its structure, the reaction of this invention will still take place but certain precautions are necessary to prevent sulfonation of the substituent group. This is easily overcome by the choice of sulfur trioxide complex and the reaction temperature. The only disadvantage attaching to the use of the more complex aromatic, heterocyclic, or other somewhat reactable substituents, is that lower temperatures may be necessary and the reaction time is extended.

Accordingly, the following additional olefinic starting materials may be used in the reaction of this invention:

4-methyl pentene-1,
3-methyl pentene-1,
3,3-dimethyl butene-1,
isopropylethylene,
1,1-diphenylethylene,
2-methylbutene-1,
heptene-1,
heptene-2,
heptene-3,
octene-1,
tetraphenyl ethylene,
triphenylethylene,
sym. diphenylethylene,
3,3,5,5-tetramethylheptene-1,
isooctene,
5-methyl-6-ethyl-4-N-propyloctene-3,
tetramethylethylene,
3,3-dimethylbutene-1,
3,3-dimethylhexene-4,
3,3,-dibutylhexene-4,
3,3,-dipropylhexene-4,
2,2-dimethylhexene-3,
unsym.-diisopropylethylene,
2,3,4-triethylpentene-2,
2,3,4-trimethylpentene-2,
2,2,3-trimethylpentene-3,
2,3,3-tripropylpentene-1,
4-methylhexylene-1,
1-decene,
1-dodecene,
2-hexene,
2-methyl-2-hexene,
3-methyl-2-hexene,
4-ethyl-2-hexene,
5-methyl-2-hexene,
3-hexene,
2,5-dibutyl-3-hexene and
2-methyl-3-hexene as known olefinic hydrocarbons.

Other starting materials include phenyltrimethylethylene, phenyltriethylethylene, phenyltributylethylene, phenyltripropylethylene, phenyltriisopropylethylene, phenyl- triamylethylene, phenyltrihexylethylene, phenyltricyclopentylethylene, diphenyldimethylethylene, diphenyldibutylethylene, diphenyldiisopropylethylene, diphenyldicyclohexylethylene, methyltriphenylethylene, butyltriphenylethylene, propyltriphenylethylene, 3-methylphenyltrimethylethylene, naphthyltrimethylethylene, dinaphthyldimethylethylene, 2-butyl-3-phenylpentene-2, 2,3-diphenylpentene-2, triphenylbutene-1, 2-isopropyl-3-naphthylpentene-2, 2,3-dinaphthylpentene-2, trinaphthylbutene-1, benzyltrimethylethylene, dibenzyldimethylethylene, naphthyldimethylethylene, 2-methyl-3-furylpentene-2, 2-methyl-3-thienylpentene-2, 2-propylthienylpentene-2, 2-butyl-3-furylpentene-2, trianthrylbutene-1, dianthryldimethylethylene, dianthryldiisopropylethylene, 2-hexyl-3-thienylpentene-2, 2-cyclohexyl-3-thienylpentene-2, and 2-cyclohexyl-3-furylpentene-2.

The nitrogen compound used in the second step of the reaction may be any nitrogen compound capable of donating a pair of electrons to the beta carbon atom of the olefinic starting material. The preferred groups of nitrogen compounds have the formula:

wherein $R_5$, $R_6$ and $R_7$ are the same or different saturated, unsaturated, straight-chain or branched-chain alkyl radicals, hydroxy-alkyl radicals, hydrogen, cycloalkyl radicals, hydroxycycloalkyl radicals, phenolic radicals, or aryl, aralkyl and heterocyclic radicals containing up to 20 carbon atoms. Where $R_5$, $R_6$ and $R_7$ are hydrogen, ammonia is the reactant nitrogen compound. Where one R group is a hydrocarbyl radical, the class of primary amines is defined by the formula. Where two of the R groups are hydrocarbyl radicals the class of secondary amines is so defined, and where all three R groups are the selected hydrocarbyl groups the general class of tertiary amines is included.

Species of nitrogen compounds include:

| | |
|---|---|
| Methylamine | Isohexylamine |
| Dimethylamine | Hepthylamine |
| Trimethylamine | Triheptylamine |
| Pentylamine | Octylamine |
| Dipentylamine | Dioctylamine |
| Tripentylamine | Nonylamine |
| Ethylamine | Decylamine |
| Diethylamine | Dodecylamine |
| Triethylamine | Trihexylamine |
| Propylamine | Cyclohexylamine |
| Dipropylamine | Dicyclohexylamine |
| Triproylamine | Tricyclohexylamine |
| Butylamine | Cyclopentylamine |
| Dibutylamine | Dicyclopentylamine |
| Tributylamine | Tricyclopentylamine |
| Isopropylamine | Methylethylamine |
| Diisopropylamine | Dimethylethylamine |
| Triisopropylamine | Diethylmethylamine |
| Isobutylamine | Ethylpropylamine |
| Diisobutylamine | Methylpropylamine |
| Triisobutylamine | Propylbutylamine |
| Amylamine | Isopropylisobutylamine |
| Isoamylamine | Benzylamine |
| Diisoamylamine | Ethyldecahydronaphthylamine |
| Triisoamylamine | |
| Tertiarybutylamine | Propyldecahydronaphthylamine |
| Ditertiarybutylamine | |
| Tritertiarybutylamine | Diethylcyclohexylamine |
| Undecylamine | Dimethylaminoethylamine |
| Decylamine | Dioctylbutylamine |
| Diamylisopropylamine | Dinonyloctylamine |
| Diamylhexylamine | Didecylpropylamine |
| Dihexylamylamine | Didodecylbutylamine |
| Diheptylmethylamine | Dioctadecylamylamine |
| Hexylamine | Aniline |

Triphenylamine
Phenyl-β-naphthylamine
Di-β-naphthylamine
N,N'-di-β-naphthyl-p-phenylenediamine
N,N'-diphenyl-p-phenylenediamine
Ditolylamines
Tolyl-naphthylamines
N,N'-ditolyl-p-phenylene-diamines
N,N'-diphenyl-toluylene-diamines
N,N'-diphenyl-naphthylene-diamines
N,N'-ditolyl-naphthylene-diamines
β,β-dinaphthaylamine
Bezylpara-amino-phenol
Phenylenediamines
Morpholine
Hydroxyamine compounds
Methanolamine
Diethanolamine
Triethanolamine
Mono-ethanolamine
Ethanolamine
2-methyl-2-amino-1-propanol
2-amino-1-butanol
2-amino-1-pentanol
Laurylamine
Guanidine
Oleylamine
Eicosenylamine
N-oleyl ethylamine
Diphenylamine
Phenyl-α-naphthylamine
Di-α-naphthylamine
N,N'-diphenylbenzidine
Phenyl-tolylamines
N,N'-ditolylbenzidenes
2-amino-1-ethanol
2-amino-3-butanol
3-amino-4-pentanol
3-amino-4-hexanol
2-amino-3-heptanol
Monomethylol dimethyl-aminomethane
Dimethylolmethylamino-methane
Trimethylolaminomethane
Furfurylamine
Tetrahydrofurfurylamine
Hexamethylenediamine
Decamethylenediamine
Propylenediamine
Ethylenediamine
3-nitropropylamine
5-carbomethoxyamylamine
5-carbamidoamylamine
Diethylaminoethylthio-ethylamine
p-ethoxycyclohexylamine
p-propylthiocyclohexyl-amine
Cyclohexanolamine
O,O'-dihydroxydicyclohexyl-amine The cation represented by A in the formulas may be any cation which will associated with the sulfonic acid group and may be hydrogen, sodium, potassium, lithium, rubidium, cesium, beryllium, magnesium, calcium, strontium, barium, or tetravalent nitrogen as the preferred class where compounds having utility as surfactants are desired. Other examples of the A group include arsenic, antimony, bismuth, chromium, molybdenum, tungsten, manganese, iron, cobalt, and nickel. It is to be observed that A may also be any of nitrogen compounds aforementioned as reactants with the nitrogen in a tetravalent state. Ammonium hydroxide may be used as the reactant cationic material. The reaction forming the compounds of type I, wherein 2 moles of the nitrogen compound reactant are used attaches same to the sulfonic acid group and to the beta carbon atom of the olefin starting material.

The various basic salts or hydroxides that may be used to transform compounds I into compounds II are the oxides and hydroxides of the foregoing metals, i.e., sodium hydroxide, potassium hydroxide, lithium hydroxide, magnesium oxide, magnesium hydroxide, calcium oxide, calcium hydroxide, barium oxide, barium hydroxide octahydrate, and ferric hydroxide.

Any inorganic or organic acid may be used to transform the initial reaction products I or II to compounds of type III. The inorganic acids to be used are hydrochloric, hydrobromic, hydroiodic, hydrofluoric, sulfuric, nitric, carbonic, and sulfurous acid, and the like. The organic acids include acetic, propionic, benzoic, lactic, citric, oxalic, butyric, hydrocyanic, malonic, oleic, succinic, lauric and valeric acid, and the like. Any acid capable of producing hydrogen ions may be used for these steps of the reaction.

The reaction is carried out by merely bringing together the olefinic reactant with the sulfur trioxide complex at temperatures best suited for the particular complex employed. In general, sulfur trioxide complexes react at temperatures between −10° to 120° C. A number of sulfur trioxide complexes are available for the reaction. Dioxane-sulfur trioxide, trimethylamine-sulfur trioxide, pyridine-sulfur trioxide, triethylamine-sulfur trioxide, dimethylformamide-sulfur trioxide, dioxane bis-sulfur trioxide, thioxane-sulfur trioxide, thioxane bis-sulfur trioxide and dimethylaniline-sulfur trioxide complexes may be used. There is a threshold temperature at which each complex becomes reactive. Consequently, the most suitable temperature range for the reaction will depend somewhat on the complexing agent used. The most suitable temperature range between −10° to 120° C. may be found by trial experiments. In general, the reactivities of the complexes is known in the art, and as in the case of pyridine-sulfur trioxide, a temperature between about 90° to 120° C. is suitable. It may be found that the intermediates decompose faster than they are formed, in which event lower temperatures and longer contact times will be necessary.

The reaction time may be from five minutes to one day and no pressure is required. Since the complexes are solids, they are used in solution or slurry form with an inert solvent. Suitable solvents include ethylene dichloride, ethylene trichloride, various organic esters such as ethyl acetate, butyl acetate, propyl acetate, unreactive naphthas or mineral oils, mineral spirits, VM & P naphtha, Stoddard solvent, and cyclohexane. With dioxane-sulfur trioxide as the reactant complexing agent, one expedient is to use an excess over the stipulated 1 molar quantity whereby the excess acts as a solvent for the reaction. Other of the complexing agents may be used in this manner.

Agitation is applied to the reaction in a known manner or may be omitted, although its use shortens the reaction time.

A color change will be observed generally as an indication of the completion of the first stage of the reaction. Various other expedients, such as detection of unreacted olefin or complex, may be used to follow the reaction and determine when equilibrium has been reached.

The addition of the reactant nitrogen compound in the second step of the reaction is conducted gradually with continued agitation. This stage of the reaction is easily followed since the beta-aminated products are solids and precipitate from the reaction mixture. Various known methods of separating the solid product may be used. Filtration under vacuum is one expedient, and centrifuging or setting may also be used. The product may be used per se without separation and recrystallization although for most uses it is the better practice to separate and purify the end products. The products may be recrystallized from any of the solvents mentioned herein or water may be used for this purpose. Identification is made through melting points, mixed melting points, refractive index, infrared analyses or analyses for the elements. The reaction may be conducted batchwise or on a continuous basis.

The step of acidifying the reaction product, where the alternative procedure of using 1 mole of sulfur trioxide complex with 2 moles of nitrogen compound is used, is readily carried out by adding a stoichiometric or excessive amount of any material capable of producing hydrogen ions in aqueous solution. The organic or inorganic acids disclosed herein are added in concentrated or diluted solutions to the reaction mixture and the pH is adjusted on the acid side. The reaction products from this alternative procedure are separated as before described in connection with the direct method using 1 mol of complex with 1 mole of nitrogen compound.

As many apparently widely different embodiments of this invention may be made without departing materially from the spirit and scope thereof, it is to be understood that the invention is not limited to the specific embodiments thereof except as defined in the appended claims.

The embodiments of the invention in which an exclusive property or privilege is claimed are defined as follows:

1. Surfactants of the formula

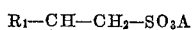

where R is an alkyl radical of 6 to 20 carbon atoms and A is a cation of the group consisting of hydrogen, alkali metal, alkaline earth metal, ammonia, anilino, iron, methyl ammonium, ethyl ammonium and propyl ammonium.

2. The alkali metal salt of 2-anilino-dodecane-1-sulfonic acid.
3. The aniline salt of 2-anilino-dodecane-1-sulfonic acid.
4. 2-anilino-dodecane-1-sulfonic acid.
5. 2-(1-pyridine)-dodecane 1-sulfonic acid.
6. A compound of the formula

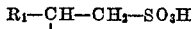
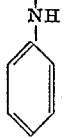

wherein $R_1$ is alkyl of 6 to 20 carbon atoms.

7. A compound of the formula

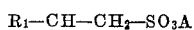
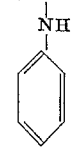

wherein $R_1$ is alkyl of 6 to 20 carbon atoms and A is an alkali metal.

8. A compound of the formula

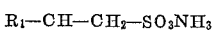

wherein $R_1$ is alkyl of 6 to 20 carbon atoms.

References Cited by the Examiner

UNITED STATES PATENTS

| | | | |
|---|---|---|---|
| 2,265,838 | 12/41 | Hentrich et al. | 260—503 |
| 2,697,116 | 12/54 | Stayner | 260—508 |
| 2,865,958 | 12/58 | Davies et al. | 260—503 |
| 2,917,512 | 12/59 | Helferich et al. | 260—508 |

FOREIGN PATENTS

| | | |
|---|---|---|
| 598,879 | 5/60 | Canada. |
| 1,161,528 | 9/58 | France. |
| 815,167 | 6/59 | Great Britain. |
| 856,404 | 12/60 | Great Britain. |

OTHER REFERENCES

Mustafa: "Chemical Reviews," vol. 54, No. 2, pp. 195–223 (1954).

Bordwell et al.: JACS, vol. 76, pp. 3945–3961.

IRVING MARCUS, *Primary Examiner.*

WALTER A. MODANCE, *Examiner.*